April 28, 1925.

F. D. WILSON 1,535,443

ELEVATOR FOR CORN HARVESTERS

Original Filed Dec. 5, 1916   3 Sheets-Sheet 1

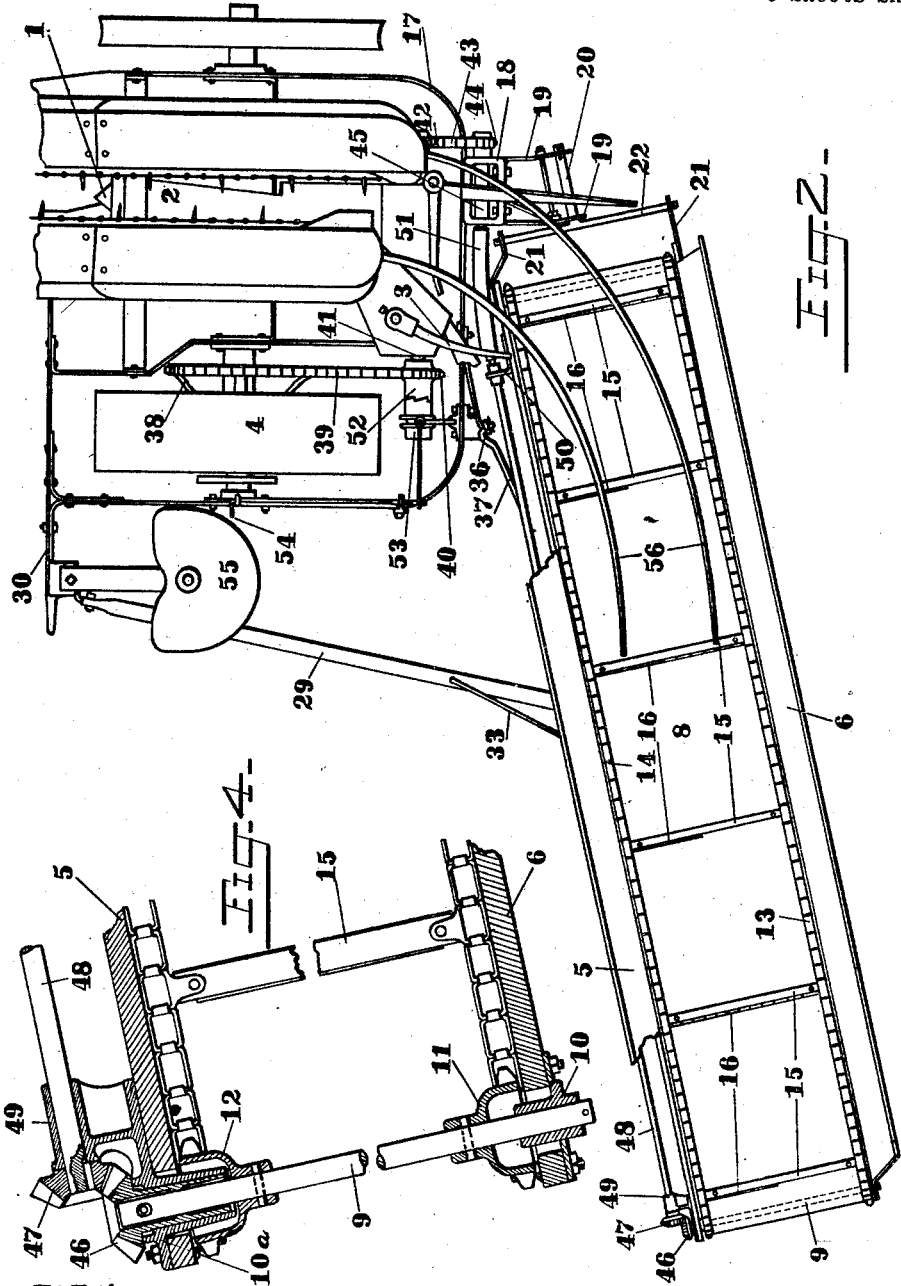

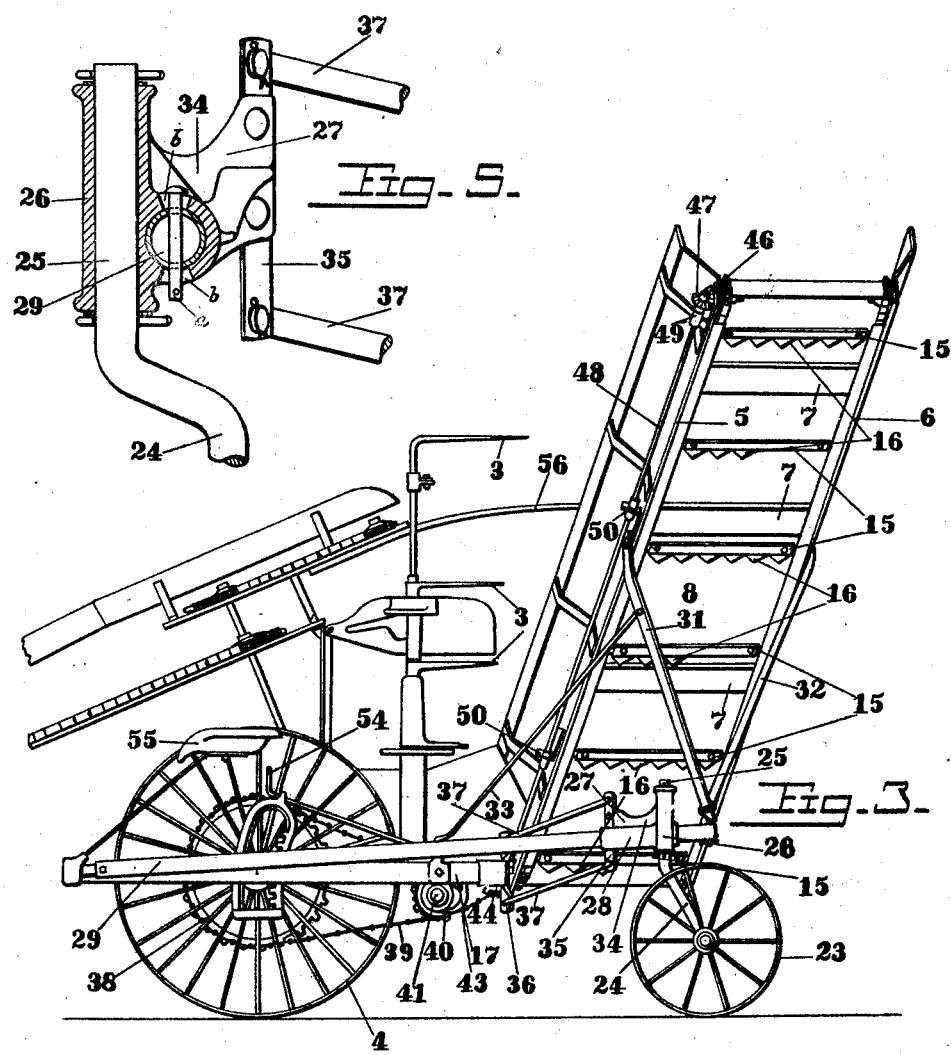

Patented Apr. 28, 1925.

1,535,443

UNITED STATES PATENT OFFICE.

FREDERICK D. WILSON, OF MOLINE, ILLINOIS, ASSIGNOR TO DEERE AND COMPANY, OF MOLINE, ILLINOIS, A CORPORATION OF ILLINOIS.

ELEVATOR FOR CORN HARVESTERS.

Application filed December 5, 1916, Serial No. 135,184. Renewed May 28, 1921. Serial No. 473,315.

*To all whom it may concern:*

Be it known that I, FREDERICK D. WILSON, a citizen of the United States, residing at Moline, in the county of Rock Island and State of Illinois, have invented certain new and useful Improvements in Elevators for Corn Harvesters, of which the following is a specification, reference being had therein to the accompanying drawing.

My invention relates to devices employed to receive bundles of corn, as they are ejected from a corn harvester and binder, and convey them to a wagon accompanying the harvester in its operation of harvesting.

The object of my invention is the production of a conveying mechanism adapted to be connected to the rear of a corn harvester and inclined to a sufficient height to effectively deliver bundles of corn to a wagon, other objects being clearly shown in the following specification.

Referring to the drawings in which similar numerals indicate identical parts—

Figure 2 is a plan view of Figure 1.

Figure 3 is a side elevation of Figure 2 taken from the stubbleward side of the harvester, and Figure 4 is a sectional detail of the upper end of the conveyor and driving mechanism, and Figure 5 is a detail of the connection of the rear of the truck with the frame.

Figure 1:
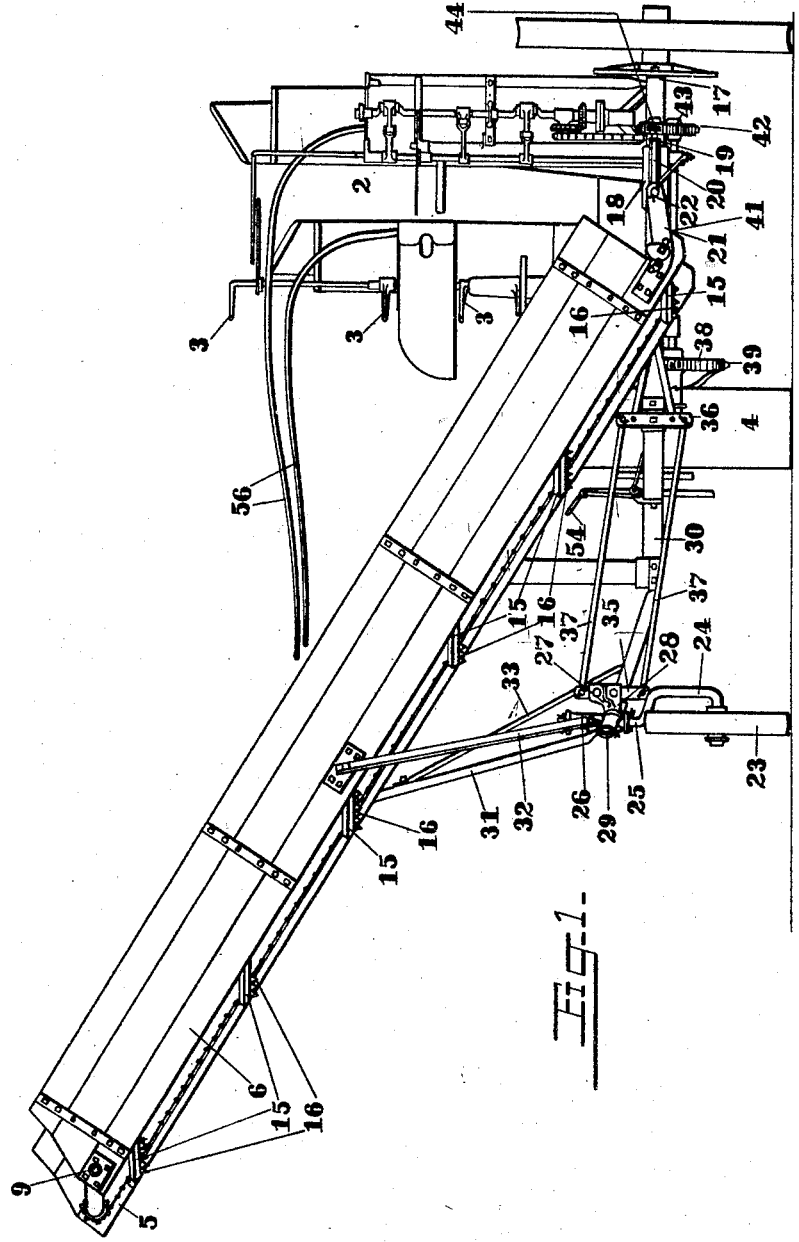
Figure 1 is a rear view of a corn harvester showing my conveyor attached thereto.

The corn harvester employed is of a well known type in which the standing corn is cut by a knife 1 and carried by conveying means along a passage way 2 to a vertical binder mechanism located on the rear of the machine, where it is bound into bundles and normally ejected to fall upon a sheaf carrier or upon the ground by the operation of a common type of ejectors 3 mounted preferably upon the knotter shaft. The entire operating mechanism is actuated by power from the bull wheel 4 of the harvester, and by suitable connecting mechanism, hereinafter fully described, my conveyor being operated from the same power.

My conveyor frame or trough comprises sides 5 and 6 which are connected by cross pieces 7, secured to the sides in any suitable manner, and on which is mounted a bottom 8 extending the full length of the conveyor. The sides 5 and 6 are flared upwardly to better accommodate the bundles of corn. At the upper end of the conveyor frame is a shaft 9, journaled in bearings 10 and 10ª secured to the sides of the frame, and a similar shaft is supported in a similar manner on the sides 5 and 6 at the lower end thereof, as shown in dotted lines Figure 2. On both shafts are rigidly mounted sprockets 11 and 12 over which lead chains 13 and 14; secured to the chains 13 and 14 and extending across the bottom 8 are slats 15 provided with vertical teeth 16.

Rigidly secured to the rear of the harvester frame 17 is a bracket 18 on which are mounted rearwardly extending arms 19. On the arms 19 is a T shaped member the stem 20 of which is pivotally supported on said arms. To the lower end of the sides 5 and 6 respectively are secured projecting arms 21 having openings in their free ends in which the extremities of the head 22 of the T shaped member are loosely journaled.

A truck, on which my conveyor is mainly carried, comprises preferably a single wheel 23 mounted on a crank axle 24 having a vertical spindle 25 freely rotatable in a bearing 26; the bearing 26 is preferably integral with a member 27 which has also a horizontal bearing 28 in which is journaled a bar 29 preferably tubular extending forwardly and pivotally connected to a laterally projecting portion 30 of the harvester frame 17; the bar 29 is secured against longitudinal movement by a pin *a* which projects through opposite slots *b* in the bearing 28 and through the bar 29, the slots *b* being provided to permit a limited rotary movement of the bar 29.

The bar 29 extends rearward of the bearing 28 and has pivotally connected therewith, a V-shaped structure formed of braces 31 and 32 extending upward to the conveyor frame and pivotally connected to the sides 5 and 6. A brace 33 is secured to the brace 31 and the bar 29.

Extending grainward from the member 27, and preferably integral therewith, is a bracket arm 34 to which is rigidly secured, parallel to the bearing 26, a bar 35; a similar bar 36, parallel to the bar 35 is rigidly mounted on the rear of the frame 17 of the harvester. Parallel rods 37 are pivotally connected to the bars 35 and 36.

Power to actuate the conveyor is transmitted from the bull wheel 4 by a sprocket 38 connected thereto, over which a chain 29 leads to a sprocket 40 loosely mounted on the countershaft 41 which is journaled in suitable bearings on the frame 17, and which also operates the binding mechanism. A sprocket 42 is secured on the grainward end of the counter shaft 41 to rotate therewith; a chain 43 leads from the sprocket 42 to a sprocket 44 rigidly mounted on a shaft 45, the latter journaled in suitable bearings in the bracket 18.

A bevel pinion 46 is mounted on the forward end of the shaft 9 and meshes with a similar pinion 47 on the end of a shaft 48. The shaft 48 is journaled in a bearing 49, and extends lengthwise of, and substantially parallel with the side 5 of the conveyor, being supported thereon by bearings 50 secured to the side 5. The lower end of the shaft 48 is connected to the shaft 45 by a section of flexible shafting 51 which may be of any desired type.

The harvester and conveyor operate simultaneously and their operation ceases simultaneously, their action being controlled by a common type of claw clutch one member 52 of which is preferably integral with the sprocket 40, the latter as before stated being loosely mounted on the counter-shaft 41; the second member 53 of the clutch rotating with the shaft 41, and slidable thereon to be engaged or disengaged from the first member by a lever 54 in proximity to the driver's seat 55; any one of a numerous class of clutches may be used, but the one I have shown is commonly used on harvesting and other agricultural machinery as best adapted for the purpose for which it is employed, to readily operate the harvesting and conveying mechanism at will.

The conveyor is inclined upwardly and stubbleward in a rearward direction so that its upper or delivery end is further to the rear of the harvester than the lower or receiving end. The bundles as they are ejected from the binder by the arms 3 are received upon the lower end of the conveyor and fall lengthwise thereof, being guided by stationary curved guides in the form of arms 56 mounted on the guide boards of the harvester. Said guides are disconnected from the carrier so that they are not affected by the rocking thereof either vertically or laterally.

As before stated the harvesting and binding mechanism of the harvester, and the conveyor are operated simultaneously and their operation ceases simultaneously by actuation of the clutch; the power to actuate the conveyor is transmitted from the counter shaft 41 to the shaft 45, by the chain 43 leading over the sprockets 42 and 44. The flexible shaft 51 being connected to the shaft 45 rotates therewith and in turn rotates the shaft 48 on the upper end of which the bevel pinion 47 is rigidly mounted. The bevel pinion 47 meshing with the bevel pinion 46, the shaft 9 and sprockets 11 and 12 are actuated to draw the chains 13 and 14 and the bars 15 upward over the bottom 8, and as the teeth 16 engage with bundles deposited on the conveyor from the harvester, the bundles are drawn upward to the end of the conveyor over which they are discharged.

As shown in the drawings, the conveyor is pivotally supported on the head extremities of the T shaped member 22 and is capable of a vertical rocking movement thereon, and it is also rockable laterally by reason of the stem 20 of the T shaped member being pivotally supported in the arms 19; the stem 20 being preferably horizontal and preferably in alinement with the longitudinal center of the conveyor. The arms 31 and 32 are pivotally connected to the conveyor and to the bar 29, the latter being pivotally supported at its forward end on a laterally projecting portion 30 of the harvester frame. It will be clear that by the pivotal support of the conveyor on the harvester and the truck a complete degree of flexibility is attained, so that the conveyor is at once adjustable to accommodate it to any irregularity of surface over which the wheels of the harvester and the wheel 23 of the truck may travel, any possibility of binding of the shafts 45 and 48 being eliminated by the flexible shaft 51 which connects them.

It will be readily apparent that the wheel 23 and the spindle 25 are always in a vertical position through the pivotal connection of the parallel rods 37 to the vertical bar 35 rigidly secured to the bracket arm 34 of the member 27, and to the bar 36 rigidly mounted on the harvester frame.

What I claim is—

1. A harvester, a conveyor adapted to receive corn therefrom and convey it stubbleward, a truck pivotally connected to the harvester and supporting the conveyor whereby the weight of the conveyor is carried by the truck, and means on the rear of the harvester to which the receiving end of the conveyor is pivotally connected and about which it may raise or lower in a vertical plane, said means including a pivot having its axis substantially in line with the longitudinal axis of the conveyor and about which said conveyor is adapted to rock.

2. A harvester, a conveyor adapted to receive corn therefrom and convey it stubbleward, a truck pivotally connected to the harvester and extending rearward thereof, means to pivotally support the conveyor on the truck, and means to pivotally support the receiving end of the conveyor on the harvester whereby the conveyor may raise or lower in a vertical plane, said means including a pivot having its axis substantially in line with the longitudinal axis of the conveyor and about which said conveyor is adapted to rock.

3. A harvester, a conveyor adapted to receive corn therefrom and convey it stubbleward, a truck pivotally connected to the harvester and extending rearward thereof, means to support the conveyor on the rear of the truck, and means to pivotally support the receiving end of the conveyor on the harvester whereby the conveyor may raise or lower in a vertical plane, said means including a pivot having its axis substantially in line with the longitudinal axis of the conveyor and about which said conveyor is adapted to rock.

4. A harvester, a conveyor adapted to receive corn therefrom and convey it stubbleward, a wheeled truck pivotally connected to the harvester and extending rearward thereof, the truck wheel being located rearward and stubbleward of the harvester, means to support the conveyor on the truck rearward of the truck wheel axis, and means to pivotally support the receiving end of the conveyor on the harvester whereby the conveyor may raise or lower in a vertical plane, said means including a pivot having its axis substantially in line with the longitudinal axis of the conveyor and about which said conveyor is adapted to rock.

5. A harvester, a conveyor adapted to receive corn therefrom and convey it stubbleward, a truck including a bar pivotally connected to the harvester and extending rearwardly and stubbleward thereof, a wheel mounted on a crank axle having a vertical spindle journaled in a bearing on said bar, means to support the conveyor on the truck rearward of the wheel axis whereby the weight of the conveyor is carried by the truck, and means to pivotally support the conveyor on the rear of the harvester whereby the conveyor may raise or lower in a vertical plane, said means including a pivot having its axis substantially in line with the longitudinal axis of the conveyor and about which said conveyor is adapted to rock.

6. A harvester, a conveyor adapted to receive corn therefrom and convey it stubbleward, a truck pivotally connected to the harvester and to the conveyor and supporting the conveyor, means to pivotally connect the receiving end of the conveyor with the harvester whereby the conveyor may raise or lower in a vertical plane, said means including a pivot having its axis substantially in line with the longitudinal axis of the conveyor and about which said conveyor is adapted to rock.

7. A harvester, a conveyor adapted to receive corn therefrom and convey it stubbleward, a truck pivotally connected to the harvester, a support for said conveyor mounted on the harvester and having an axis substantially in line with the longitudinal axis of the conveyor and about which said conveyor is adapted to rock, and a pivotal connection of said conveyor and support having its axis in the direction of the line of draft whereby the stubbleward end of said conveyor can be raised or lowered.

8. A harvester, a conveyor adapted to receive corn therefrom and convey it stubbleward, a truck pivotally connected to the harvester and supporting the conveyor, means to pivotally connect the receiving end of the conveyor with the harvester to permit a longitudinal and transverse rocking movement of the conveyor, means operable to actuate the conveyor, and a flexible shaft connecting said actuating means with the harvester whereby the power of the latter is transmitted to actuate the conveyor.

9. A harvester, a conveyor adapted to receive corn therefrom and convey it stubbleward, said conveyor having its delivery end rearwardly of its receiving end, means to pivotally connect the receiving end of the conveyor with the harvester to permit a longitudinal and transverse rocking movement of the conveyor, means operable to actuate the conveyor, and a flexible shaft connecting said actuating means with the harvester whereby the power of the latter is transmitted to actuate the conveyor.

10. A harvester, an inclined conveyor adapted to receive corn therefrom and convey it stubbleward, said conveyor having its delivery end rearward of its receiving end, means to pivotally support the receiving end of the conveyor on the harvester, said means including a pivot disposed longitudinally of the conveyor whereby the conveyor may rock transversely, and a pivot disposed transversely of the conveyor whereby the latter may raise or lower to different degrees of inclination, means operable to actuate the conveyor, and a flexible shaft connecting said actuating means with the harvester whereby the power of the latter is transmitted to actuate the conveyor.

11. A harvester, a conveyor adapted to receive corn therefrom and convey it stubbleward, means to pivotally support the receiving end of the conveyor on the harvester, said means comprising a pivot disposed longitudinally of the conveyor whereby the conveyor may rock transversely, and a pivot disposed transversely of the conveyor whereby the latter may raise or lower, and means to actuate the conveyor.

In testimony whereof I affix my signature, in presence of two witnesses.

FREDERICK D. WILSON.

Witnesses:
JESSIE SIMSER,
W. G. DUFFIELD.